United States Patent
Saul (10) Patent No.: US 8,974,139 B2
(45) Date of Patent: Mar. 10, 2015

(54) CONNECTOR FOR FURNITURE AND METHOD OF FRAME MANUFACTURE AND ASSEMBLY

(76) Inventor: Gregory M Saul, Charlotte, NC (US)

( * ) Notice: Subject to any disclaimer, the term of this patent is extended or adjusted under 35 U.S.C. 154(b) by 916 days.

(21) Appl. No.: 12/753,525

(22) Filed: Apr. 2, 2010

(65) Prior Publication Data

US 2010/0254757 A1 Oct. 7, 2010

Related U.S. Application Data

(60) Provisional application No. 61/166,066, filed on Apr. 2, 2009.

(51) Int. Cl.
  *B25G 3/00* (2006.01)
  *E21B 17/046* (2006.01)
  *A47C 4/02* (2006.01)
  *F16B 12/12* (2006.01)
  *F16B 12/20* (2006.01)

(52) U.S. Cl.
  CPC ............... *A47C 4/02* (2013.01); *F16B 12/125* (2013.01); *F16B 12/20* (2013.01); *Y10S 403/11* (2013.01)
  USPC ............... 403/331; 403/DIG. 11; 297/440.1; 297/463.1; 29/428

(58) Field of Classification Search
  USPC ............... 403/205, 231, 300, 310, 311, 331, 403/DIG. 10, DIG. 11, DIG. 13; 446/85, 108, 446/109, 116, 120, 121; 29/91, 91.1, 428, 29/525.01, 897, 897.312; 297/440.1, 297/440.14, 440.15, 463.1; 211/183, 192; 312/111, 257.1, 263, 265.5
  See application file for complete search history.

(56) References Cited

U.S. PATENT DOCUMENTS

| | | | | | |
|---|---|---|---|---|---|
| 3,037,593 | A | * | 6/1962 | Webster | 52/476 |
| 3,589,755 | A | * | 6/1971 | King | 52/584.1 |
| 4,258,464 | A | * | 3/1981 | Ullman, Jr. | 29/525.01 |
| 4,646,497 | A | * | 3/1987 | Hoenle | 52/285.2 |
| 4,797,021 | A | * | 1/1989 | Stamper | 403/165 |
| 5,478,145 | A | * | 12/1995 | Kamachi | 312/263 |
| 5,546,720 | A | * | 8/1996 | LaBruzza | 52/587.1 |
| 5,647,185 | A | * | 7/1997 | Forlini | 52/604 |
| 5,913,781 | A | * | 6/1999 | Vidmar et al. | 52/102 |
| 6,086,444 | A | * | 7/2000 | Glickman | 446/124 |
| 7,108,577 | B2 | * | 9/2006 | Peters et al. | 446/124 |
| 7,434,304 | B2 | * | 10/2008 | Owens | 29/525.01 |
| 7,467,721 | B2 | * | 12/2008 | Choi | 211/189 |
| 2007/0063118 | A1 | * | 3/2007 | Owens et al. | 248/300 |
| 2008/0191538 | A1 | * | 8/2008 | Berg et al. | 297/440.14 |
| 2010/0034582 | A1 | * | 2/2010 | Howlett | 403/333 |

* cited by examiner

*Primary Examiner* — Michael P Ferguson
*Assistant Examiner* — Nahid Amiri
(74) *Attorney, Agent, or Firm* — Moore & Van Allen PLLC (57) ABSTRACT

A connector having a first interlocking member, a second interlocking member, and wherein the second interlocking member is structured to matingly engage the first interlocking member in a female/male connection.

20 Claims, 6 Drawing Sheets

CONNECTOR FOR FURNITURE AND METHOD OF FRAME MANUFACTURE AND ASSEMBLY

FIELD OF THE INVENTION

The present invention relates to a mechanical connector and, more particularly, to a mechanical connector for furniture.

BACKGROUND OF THE INVENTION

Large furniture pieces like club chairs, sofas, loveseats and such can benefit greatly from the ability to ship the furniture piece partially unassembled to allow the separated components to be nested tightly together and to ship in a much smaller carton than if it is assembled. There would be substantial cost savings in being able to ship almost twice as many units of furniture in a standard shipping container, both in shipping and in storage costs. Another advantage for single chairs would be the use of a smaller carton having the ability, over fully assembled pieces, to ship whole units by standard rate bulk-shipping methods at a much lower cost. This would be especially desirable to furniture retailers who are selling furniture primarily through catalogs or internet sites and are regularly shipping furniture over long distances. The furniture can then be assembled by the furniture manufacturer, the dealer or retail establishment and in some cases by the consumer in their home or place of business.

An additional benefit of separating the components is the cost savings associated with applying upholstery to several smaller pieces as opposed to upholstering whole assembled frames which require more hours to produce, higher skilled labor and large specialized work tables to facilitate handling and repositioning of the heavy frames. In the case where part of a piece of furniture is damaged, for whatever reason, the smaller separate components could be replaced as needed at a much lower cost to produce and ship.

The prior art for ready-to-assembly ("RTA") systems as described have several problems which make the systems either hard for the furniture manufacturers to assemble the separate components or hard for the technicians and the consumers to perform the final assembly of the furniture pieces. For example, U.S. Pat. Nos. 4,932,720 and 5,069,506 describe systems that use screws or nuts and bolts to perform the final assembly process of the upholstered frame sub-assemblies by the consumer or field technician. These systems require hand tools and a basic knowledge of furniture assembly and the fasteners can be difficult to align and secure. When the fastener's threads are not aligned properly, either through the fault of the factory or the assembler, the metal fasteners can be very difficult to engage and possibly become "cross-threaded" which would render them inoperable. If the mechanical fasteners are not tightened properly the frames can be loose and unstable.

In addition, U.S. Pat. Nos. 5,265,939 and 6,715,837 use sliding sheet metal brackets that attach to the surface of the frame material with screws and the entire shear load placed on the connectors is carried by the screws as is also the case with other conventional connectors. These screws are hard to align through the upholstery fabrics during the manufacturing process and the sheet metal material has sharp edges that can damage the softer upholstery fabrics during shipping, storage and during the final assembly process by the consumer.

Both U.S. Pat. Nos. 5,601,340 and 5,709,500 additionally require the installation of separate locking pins that can be difficult to align and the pins are not attached to the frames so they can be lost or damaged during shipping, leading to costly returns or delays.

SUMMARY OF THE INVENTION

The present invention describes a connector and a method of frame manufacture and method of furniture assembly that improve the way that RTA upholstered furniture can be manufactured in the furniture factory and later assembled by a field assembly technician or by the consumer.

Each connector consists of two interlocking members that have opposing and interlocking portions that are formed in such a way that when the base of the first interlocking member is attached to one frame sub-assembly and the base of the second interlocking member is attached to a second frame sub-assembly, the interlocking members can be slid together and engaged to provide a secure and substantially rigid final assembly.

Advantageously, when connectors are made in accordance with the present invention they provide a method for constructing and assembling furniture pieces that is self-aligning and can be easily accomplished by the untrained consumer without the need for secondary fasteners or tools. In addition, the connectors provide an attachment method that is devoid of any sharp edges or otherwise abrasive surfaces that could cause the consumer to accidentally cut or damage the upholstery fabrics, textiles or leather materials during the assembly process, causing the furniture piece to be returned to the furniture manufacturer due to such damage.

The interlocking members of the connector can be made out of a variety of materials, including different metals and plastics that can be molded, cast or machined. The interlocking members of the connector are preferably constructed of a relatively rigid material so that the connectors will be less prone to permanent deformation and loss of operational ability. In one embodiment of the invention the interlocking members of the connector are injection molded using a relatively rigid plastic material. Connectors made according to the invention would require a simple two piece mold that would allow for the integral molding of all of the features described by the invention into the interlocking members of the connector and could be inexpensively and consistently produced in large quantities so that no additional components or secondary operations would be necessary for either connector. All of the connector sides and ribs that are oriented in the direction of the mold separation should be given the proper mold draft so that the connector parts can be de-molded quickly and easily.

A plastic material would also inherently provide less friction between the surfaces of the interlocking members of the connector as they are engaged and would not require the use of lubricants. The interlocking members of the connector could be engaged and disengaged a number of times without significant loss of function. The connector is designed to accommodate a wide variety of furniture styles and functions and could be applied to other panel to panel assembly applications as well.

The present invention provides a method of frame manufacture that would allow for exact alignment of the interlocking members of the connector to the individual frame members that can be accomplished quickly and easily in the furniture factory with less chance of operator error and reduced labor costs. Further, when the interlocking members of the connector are attached to the frame members in accordance with the present invention the result would be an improved distribution of the applied shear loads from the interlocking members of the connector to the structural members of the frames and would provide a more durable and secure final assembly to the consumer.

Furniture pieces made in accordance with the present invention would be economical to produce in the furniture factory and because the individual component pieces are relatively flat they can be nested tightly into much smaller cartons than if fully assembled. The interlocking members of the connector, being devoid of sharp edges or abrasive surfaces, would allow for the components to be nested tightly without the risk of the connectors damaging the upholstery fabrics during shipping or storage.

BRIEF DESCRIPTION OF THE DRAWINGS

Having thus described embodiments of the present invention in general terms, reference will now be made to the accompanying drawings, wherein:

DETAILED DESCRIPTION OF THE INVENTION

Figure 1:
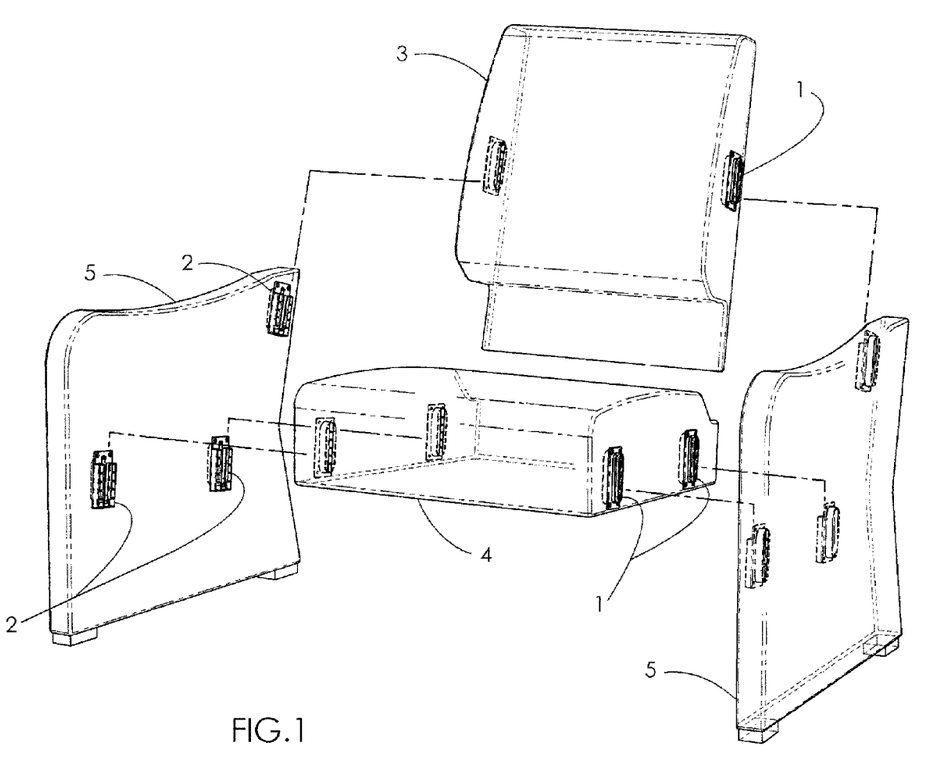
FIG. 1 is an exploded perspective view illustrating a connector system according to one embodiment of the present invention, as it would be applied on a typical upholstered chair frame.
Figure 2:
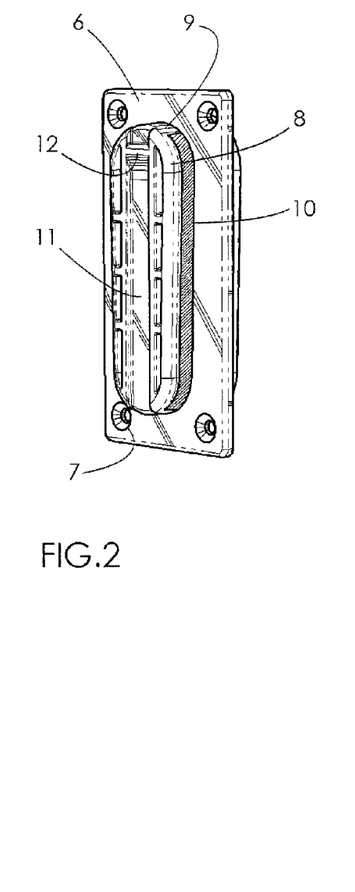
FIG. 2 is a perspective view illustrating a first connector, according to one embodiment of the present invention.
Figure 3:
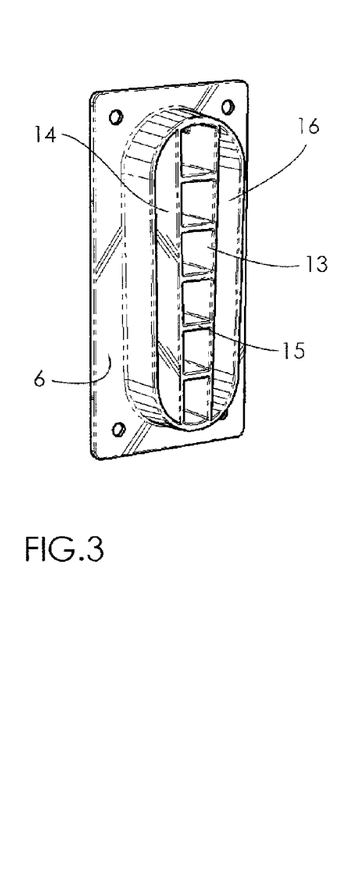
FIG. 3 is a perspective view illustrating the first connector of FIG. 2 from a reverse angle.

Referring to the drawings and, in particular to FIG. 1, there is illustrated one embodiment of the invention in which four frame components of an item of furniture, namely the back 3, seat 4, and sides 5 of a chair, that is secured together using the connectors of the present invention. Referring to FIGS. 2-15 each connector comprises first and second interlocking members that are structured to matingly engage one another. Referring to FIGS. 2, 3, 4 and 5, the first connector includes a base plate or first base member 6 with a relatively uniform wall thickness that includes four holes 7 through the face of the plate, one at each corner, for attaching the first interlocking member of the connector to the surface of a frame member with mechanical fasteners during the initial assembly process. The base plate 6 can be rounded on all four corners and all exposed edges to prevent tearing of the upholstery fabric during the assembly process. The four holes 7 can include a recessed countersink or counter bore to allow for the head of the fasteners to be recessed below the surface of the plate so they do not interfere with the sliding engagement of the two connectors 1 and 2.

A first interlocking member of the connector includes a top plate or first raised portion 8 that is smaller in size than the base plate 6, with the face of the top plate 8 parallel to the face of the base plate 6 and aligned along a central axis. The top plate is set back from the edges of the base plate on all four sides and the two lateral sides of the raised portion are tapered 19 in at one end to allow for some additional room between them when the two interlocking members of the connector 1 and 2 are first aligned, but with the fit becoming tighter as the two interlocking members of the connector are further engaged and finally with full surface to surface contact between the two interlocking members of the connectors when fully engaged to form a rigid structure in the final assembled state. The top plate 8 is rounded on all four corners 22 and along both top and bottom edges 18 around the entire perimeter to prevent accidental tearing of the upholstery material during the final assembly process by the consumer. In one embodiment, the surface of the top plate can be hollowed out 20 in several areas to allow for the placement of structural ribs 21 that add rigidity to the raised portion and reduce the amount of material needed to mold the part. In another embodiment, part of the top plate is hollowed out to include a long recessed groove 11 down the central axis that is open at least on one end and with a cross rib 12 running across the groove 11 and set in from the other end to form a snap lock attachment with the second interlocking member of the connector. One side of the rib 12 can form a ramp from the top of the rib 12 to the bottom of the groove 11 to aid in the engagement of the snap lock.

Figure 5:
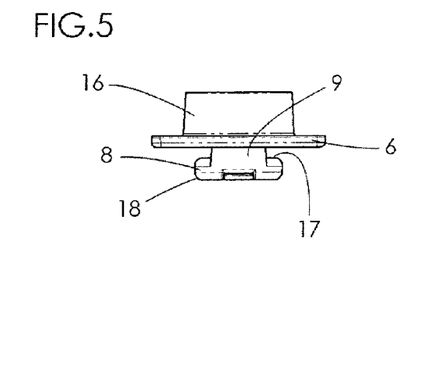
FIG. 5 is an orthographic top view illustrating the first connector of FIG. 2.
Figure 6:
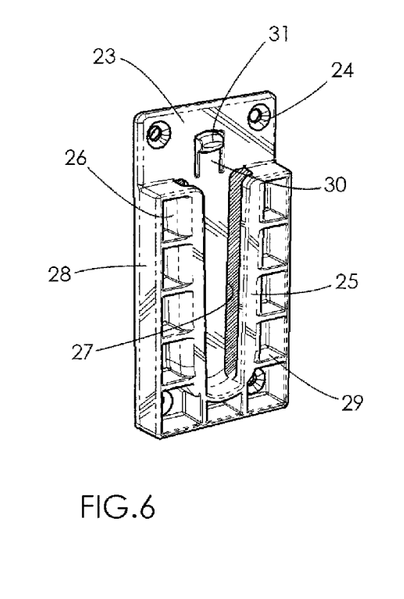
FIG. 6 is a perspective view illustrating a second connector, according to one embodiment of the present invention.
Figure 7:
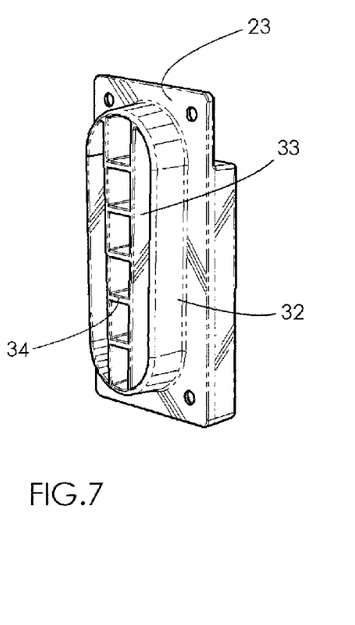
FIG. 7 is a perspective view illustrating the second connector of FIG. 6 from a reverse angle.

The top plate 8 is rigidly supported in position off of the base plate 6 and connected to the base plate 6 by means of a central support member or first support member 9 that can be integrally molded therebetween and is the same length as the top plate and located along the central axis, but smaller in width so that the top plate forms overhanging members 17 on each of the two lateral sides of the top plate 8. In other words, as illustrated in FIG. 5, at least a portion of the top plate or first raised portion 8 overhangs the edges of the central support member or first support member 9. In one embodiment, on either side of the central support member 9 there are openings 10 in the base plate 6 that are the same shape, but slightly larger than the top plate 8 in plan view, to allow for portions of the mold tool to extend through the base plate and form the overhanging members 17 without the need for additional side-action slides in the mold tooling. This is important to reduce both the cost of fabricating the tool and the cycle time of the molding process to keep the processing cost low. In one embodiment, the central support member 9 is open to the opposite side of the base plate from the top plate and is hollowed out 13 to allow for multiple interior ribs or supports 15 to make the connector 1 more rigid and to reduce the amount of material needed to form the connector 1.

In one embodiment of the invention the central support member 9 extends past the opposite side of the base plate 6 from the top plate 8 to provide additional support and rigidity to the connector structure. The central support member extension 14 is intersected on either end by a perimeter support rib 16 that is positioned around the perimeter of the two holes 10 in the base plate 6 that are used to form the overhanging members 17 of the top plate 8. The perimeter support rib 16 extends off the surface of the base plate 6 to the same height as the central support member extension 14 and intersects at either end of the central support member extension 14 to form a continuous surface on the outside of the perimeter support rib 16 to distribute the loads placed on the central support member 9 across more of the surface of the base plate 6. In addition to increasing the rigidity of the connector 1, the perimeter support rib 16 is used during the initial assembly process to locate and align the connector 1 into matching recesses that are machined into the frame components 3, 4, and 5. The perimeter support rib 16 is also tapered in plan view and rounded on the corners, to coincide with the shape of the top plate 8 in plan view and the asymmetrical shape of the perimeter support rib 16 is instrumental in causing the connector 1 to only be installed into the frame components 3, 4, and 5 in a single orientation that cannot be reversed or misaligned.

Referring to FIGS. 6, 7, 8 and 9, the second interlocking member of the connector 2 is shown and includes a base plate or second base member 23 that is equal in size and shape to the base plate 6 of the first interlocking member of the connector 1 and with the screw holes 24 in each of the four corners. At one end of the base plate 23 are provisions for a flexible member 30 with a small protruding rib 31 that is located so that when the two interlocking members of the connector 1 and 2 are matingly engaged the protruding rib 31 slides along the recessed groove 11 in the top plate 8 of the first interlocking member of the connector 1 and flexes over the cross rib 12 in the groove 11 to flex back and lock the two interlocking members of the connector 1 and 2 together when fully engaged.

The second interlocking member of the connector 2 includes a top plate or second raised portion 25 that is structured to secure the top plate 8 of the first connector 1. The top plate 25 of the second interlocking member of the connector 2 defines an opening along the long central axis that is the same width as the central support member 9 of the first interlocking member of the connector 1, to form a slot 37 that is open on one end to receive the central support member 9 of the first interlocking member of the connector 1 when being engaged.

Figure 4:
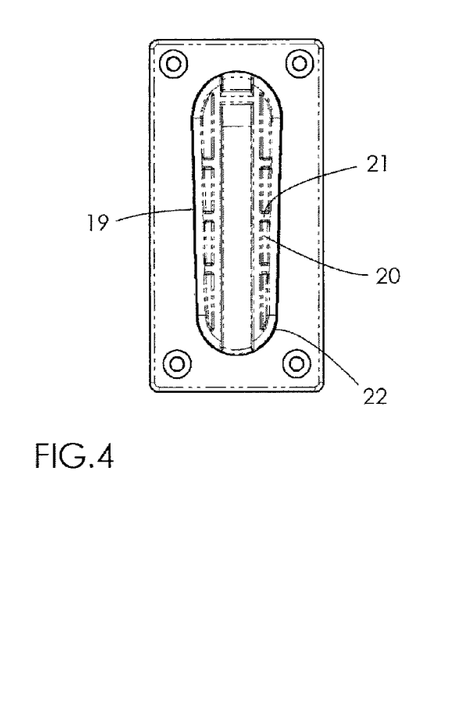
FIG. 4 is an orthographic plan view illustrating the first connector of FIG. 2.
Figure 8:
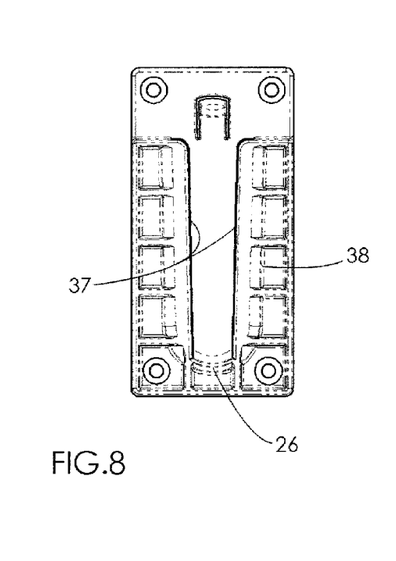
FIG. 8 is an orthographic plan view illustrating the second connector of FIG. 6.
Figure 9:
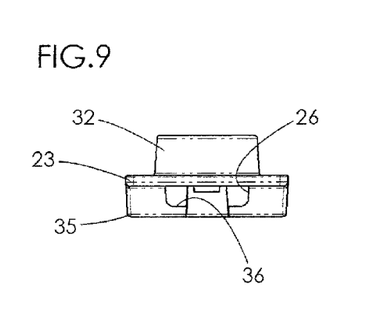
FIG. 9 is an orthographic top view illustrating the second connector of FIG. 2.

The top plate 25 of the second interlocking member of the connector is attached to the base plate 23 and supported in position by an outer supporting member or second support member 26 that can be integrally molded and that is located around the outside perimeter of the top plate 25 on three sides, with the side that corresponds to the open end of the slot in the top plate 25 left unsupported for engagement into the slot by the first interlocking member of the connector 1. In one embodiment, there are two openings 27 in the base plate 23 of the second interlocking member of the connector 2 that are located to the inside of the outer supporting member 26 to allow for portions of the mold tool to extend through the base plate and form the overhanging members 36 of the top plate 25 of the second interlocking member of the connector 2. In other words, at least a portion of the top plate or second raised portion 25 overhangs the edges of the outer supporting member or second support member 26. The overhanging members 36 of the top plate 25 of the second interlocking member of the connector are supported by the outer supporting member 26 in such a way that the resulting shape forms two opposing channels with the open side of the channels facing toward the center slot 37 of the second interlocking member of the connector 2 and in the opposite direction as the overhanging members 17 of the top plate 8 on the first interlocking member of the connector 1. The top plate 25 and outer supporting member 26 of the second interlocking member of the connector 2 are tapered along the long sides 38 and the inside shape of the outer supporting member 26 is sized to correspond to the outside perimeter of the top plate 8 of the first interlocking member of the connector 1 so that full surface to surface contact is achieved when the first and second interlocking members of the connector 1 and 2 are fully engaged. In other words, as illustrated in FIGS. 4 and 8, the width of the top plate or first raised portion 8 and the central support member or first support member 9 are tapered or increase from one end (a first end) to another end (a second end) to correspond to the tapered sides of the top plate or second raised portion 37 and tapered sides of the outer supporting member or second support member 38.

In addition to the outer supporting member 26, a secondary support rib 28 protrudes from the base plate 23 around three sides of the base plates outermost edges, to the same height as the top plate 25, and connected to the outer supporting member 26 by a series of connecting ribs 29 molded between them to add strength and rigidity to the structure. All of the connecting ribs 29, secondary support rib 28, top plate 25 and outer support member 26 on the second connector 2 are rounded along all outside edges and corners 35 to prevent tearing of the upholstery fabric during the assembly procedures.

The second interlocking member of the connector 2 also includes an extension of the outer support member 26 that protrudes from the opposite side of the base plate 23 from the top plate 25 and forms a continuous perimeter support rib 32 that is the same size and shape as the perimeter support rib 16 on the first connector. The perimeter support rib 32 of the second interlocking member of the connector 2 is intersected on either end by a series of ribs 33 that run up the central axis between the two narrow openings in the base plate 23 and are configured with additional cross ribs or supports 34 to match the first interlocking member of the connector 1 so that the two interlocking members of the connector will be equally rigid in structure and in their distribution of load forces.

Figure 10:
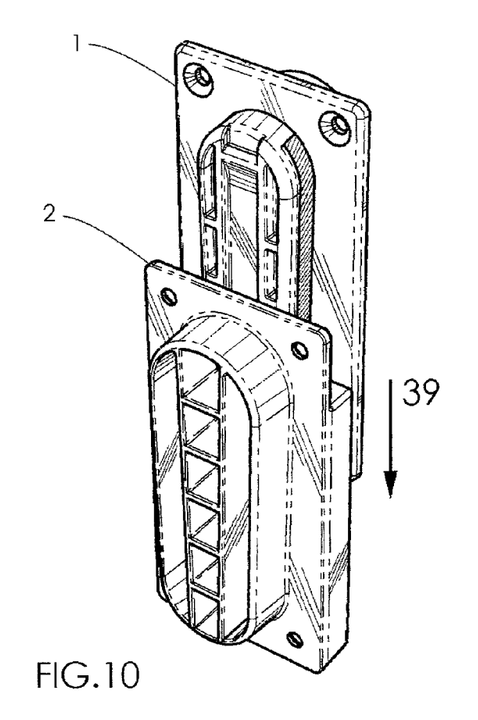
FIG. 10 is a perspective view illustrating the first and second connectors of FIG. 2 and FIG. 6, respectively, partially engaged.
Figure 11:
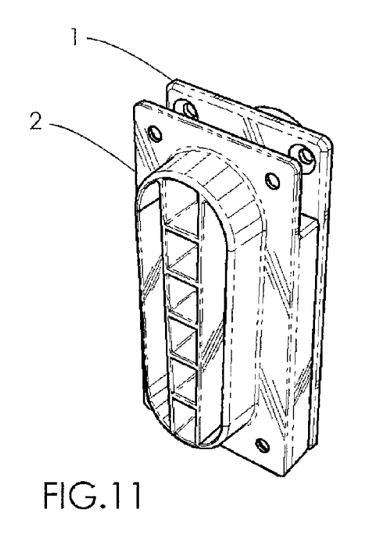
FIG. 11 is a perspective view illustrating the first and second connectors of FIG. 2 and FIG. 6, respectively, fully engaged.
Figure 12:
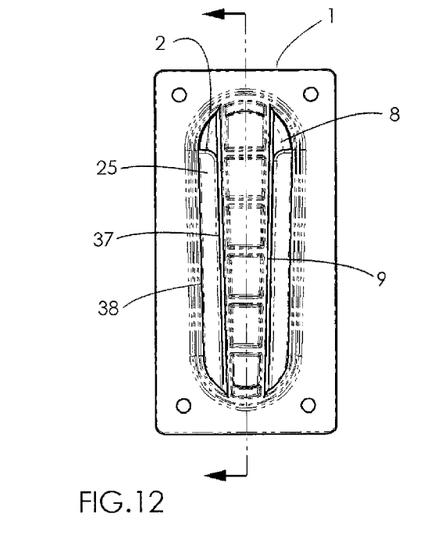
FIG. 12 is an orthographic plan view illustrating the first and second connectors.

As shown in FIGS. 10 and 11, the result is a connector that securely engages in a sliding action in the direction 39 of the long central axis.

Referring to FIGS. 12, 13, 14 and 15, where the overhanging members of the top plate 8 of the first interlocking member of the connector 1 are engaged into the opposing channels 42 formed by the overhanging members of the top plate 25 of the second interlocking member of the connector 2 to thereby form a male/female connection assembly. In addition, the outer face of the top plate 8 of the first interlocking member of the connector 1 is engaged in full surface to surface contact 43 with the top surface of the base plate 23 of the second interlocking member of the connector 2, and the inward facing surface of the top plate 8 of the first interlocking member of the connector 1 is engaged in full surface to surface contact with the inward facing surface of the top plate 25 of the second interlocking member of the connector 2 that are in opposition. Secondly, the long tapered sides on the outside of the top plate 9 of the first interlocking member of the connector 1 engage in full surface to surface contact with the long tapered inside surface of the outer support member 38 of the second interlocking member of the connector 2. Thirdly, the long sides created by the slot 37 in the top plate 25 of the second interlocking member of the connector 2 engage in full surface to surface contact with the opposing sides of the central support member 9 of the first interlocking member of the connector 1. When fully engaged to the point where the corresponding tapered surfaces are in contact with each other and the flexible locking member 31 of the second interlocking member of the connector 2 has engaged with the corresponding cross rib 12 on the first interlocking member of the connector 1, the first and second interlocking members of the connector 1 and 2 are rigidly locked from movement in all directions except for the reverse of the direction of engagement 39. The flexible snap lock feature provides for the first and second interlocking members of the connector to be disengaged by applying some force on the first and second interlocking members of the connector in the opposite direction of engagement so that the first interlocking member of the connector 1 and the second interlocking member of the connector 2 can be separated from each other.

Figures 13, 14, 15:
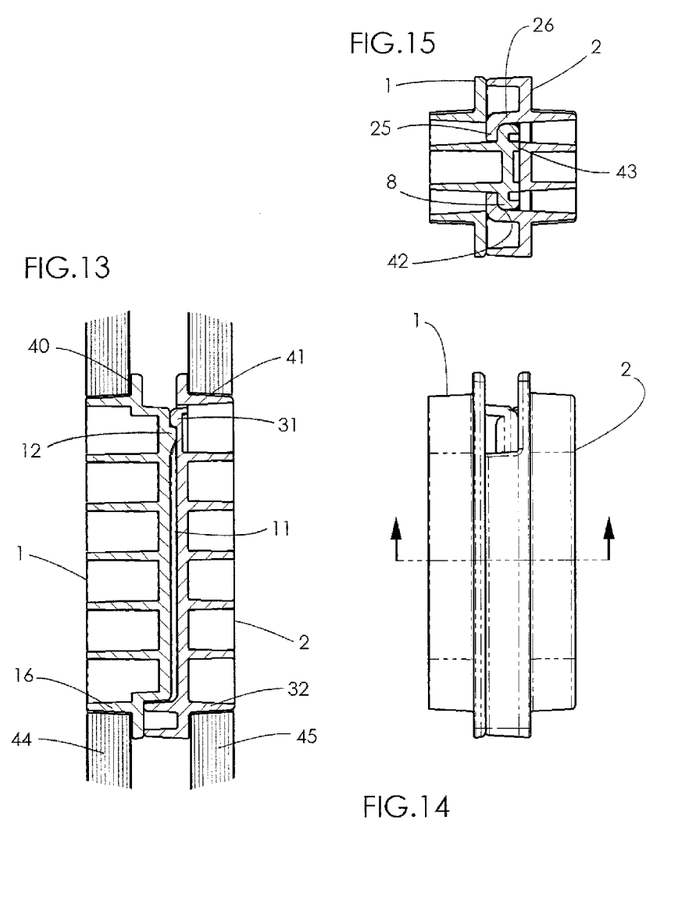
FIG. 13 is a sectional view illustrating the first and second connectors of FIG. 2 and FIG. 6, respectively, along the long central axis of the first and second connectors when attached into the surface of the separate frame members of an item of furniture and fully engaged.
FIG. 14 is an orthographic side view illustrating the first and second connectors of FIG. 2 and FIG. 6, respectively, fully engaged.
FIG. 15 is a sectional view illustrating the first and second connectors of FIG. 2 and FIG. 6, respectively, along the short central axis of the first and second connectors when fully engaged.

The perimeter rib structures 16 and 32, extending from the base plates of each interlocking member of the connector and that come in contact with the furniture frame members 44 and 45, provide for several functional advantages during manufacture of the upholstered components and in enhancing the structural integrity of the assembled frame.

Included is a means of distributing the larger shear loads placed on the seat and back components 44 directly to the frames of the side support components 45 so that the shear loads are not supported solely by the attachment screws as is the case with some of the prior art inventions. The perimeter rib members are fitted into a corresponding cavity that is machined into the surface of the frame members of each component, using generally known machining processes, so that when one side of the base plates 40 comes in contact with the surface of the corresponding frame member, the perimeter rib comes into contact with the corresponding surface 41 of the cavity around the entire length of the interlocking member of the connector.

Figure 16:
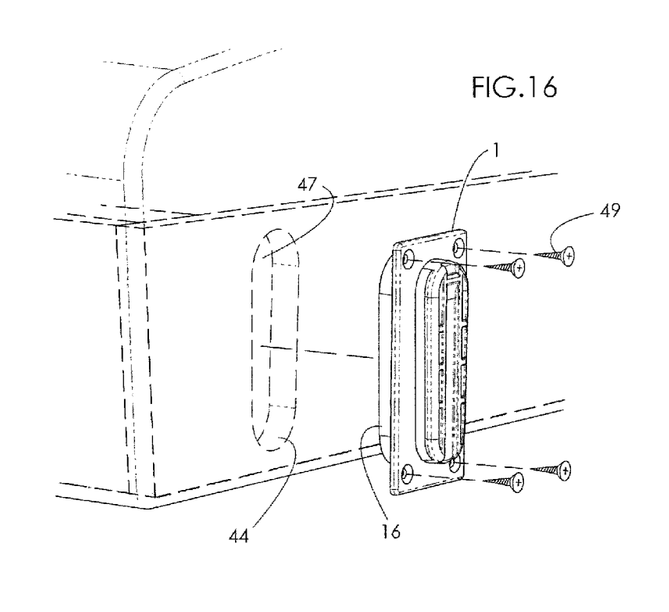
FIG. 16 is an exploded perspective view illustrating the first connector of FIG. 2 attached into the surface of a frame member.
Figure 17:
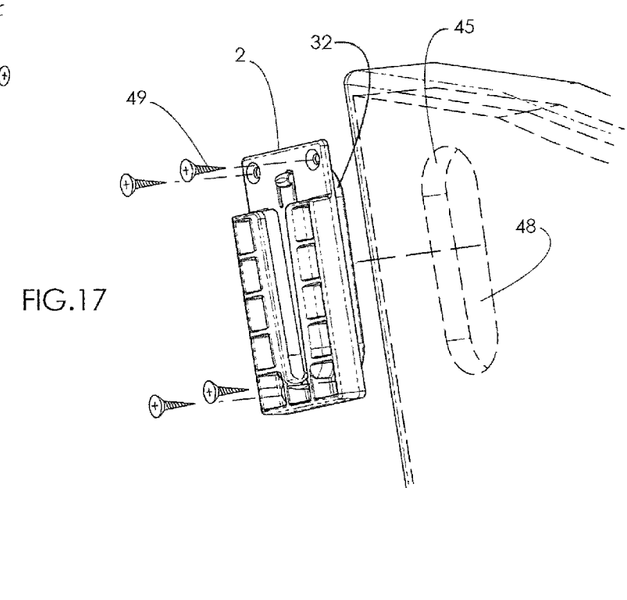
FIG. 17 is an exploded perspective view illustrating the second connector of FIG. 6 as attached into the surface of a frame member.

Referring to FIGS. 16 and 17, the first and second interlocking members of the connectors 1 and 2 are secured to the surface of the frame members 44 and 45 with self-tapping screws 49, applied through the holes molded into each of the four corners of the base plates of each interlocking member of the connector. The screws 49 would secure the first and second interlocking members of the connector in the direction that is perpendicular to the direction of engagement and that is horizontal to the floor but they would not have to support all of the heavier shear loads when applied to the seat and back components.

In addition, the perimeter rib structures 16 and 32 would allow for a faster, more convenient method of aligning and attaching the interlocking members of the connector to the individual frame components during the manufacturing process. The structural frame components can be manufactured in a variety of materials, including generally accepted wood frame construction; CNC cut composite wood panels or a variety of plastic molding processes. In one embodiment of the invention the interior frames 44 and 45 are constructed of composite wood panel materials that are machined to shape using CNC cutting equipment to insure accuracy. The interior frame assemblies are machined to include the cavities 47 and 48 to accept the first and second connectors 1 and 2 in the proper alignment and the frames are then covered in upholstery materials such as foam and fabric or leather that are fastened to the frame using generally accepted upholstery techniques. The cavities 47 and 48 provide a larger opening in the inner frames that is easier for the upholstery technician to locate through the upholstery materials than smaller individual screw holes as is the case with many of the prior art inventions. In addition the asymmetrical shape of the tapered perimeter ribs 16 and 32 and corresponding cavities 47 and 48 will not allow the assembler to install the interlocking members of the connector 1 and 2 in any orientation other than the correct one. This allows for the fast and consistent installation of the interlocking members of the connector into the separate upholstered components with less chance for error in the initial assembly process. In addition, the tight fit of the interlocking members of the connector into the frame cavities and the direct distribution of the shear loads to the supporting frame components allow for the use of smaller diameter, self-drilling screws 49 that do not require the extra expense of drilling pilot holes or the extra labor costs to properly align the screws with the pilot holes.

Further, by extending the structural support members of the interlocking members of the connector from both sides of the base plates and better distributing the applied loads, the amount that each interlocking member of the connector needs to protrude from the assembled frame component and the corresponding area of engagement is minimized. This allows for the mating frame components 44 and 45 to be spaced closer together when the interlocking members of the connector 1 and 2 are fully engaged and makes it possible to easily hide the interlocking members of the connector from view when the final assembly of the furniture piece is completed. In the case of an upholstered chair, the interlocking members of the connector would be easily hidden within the upholstery materials and no additional frame members would be needed to hide the interlocking members of the connector. The low profile of the interlocking members of the connector also helps in both reducing the size of the carton and in minimizing the risk of tearing the upholstery during shipping and storage.

As applied to the upholstered chair assembly in FIG. 1, first interlocking members of the connector 1 are rigidly attached to the separate back 3 and seat 4 frame components on opposite outward facing sides of each component, so that the smaller end of the taper is oriented in a downward direction towards the floor. The number of interlocking members attached to each component will vary from one to a plurality depending on the load to be supported. The corresponding second interlocking members of the connector 2 are rigidly attached to the inward facing mating surface of each supporting side frame components 5, so that the open and larger end of the taper is facing in the upward direction to receive the first connectors of the mating seat and back components. This preferred orientation causes the first interlocking members of the connector 1 on the seat 4 and back 3 components to be engaged downward into the receiving end of the second interlocking members of the connector 2 on the side frames 5 in a way that orients the seat 4 and back 3 in the proper position above the floor to provide the seat and back heights and angles that provide the proper anatomical support to the person sitting in the chair. In this orientation the weight of the person sitting in the chair acts to keep pressure on the interlocking members of the connectors in the direction of engagement so that the interlocking members of the connectors can not be disengaged during use. When not in use the interlocking members of the connectors 1 and 2 are kept engaged by gravity and accidental disengagement during handling or moving of the furniture is prevented by the snap lock feature of the connectors.

Final assembly in the field, either by a technician or by the consumer is accomplished quickly and easily without the need for screw drivers, wrenches or other tools. The separate components are removed from the smaller shipping carton and the first interlocking members of the connectors on one side of the seat component are visually aligned with the second interlocking members of the connectors on the side frame component to begin engagement. The tapered shape of the interlocking members of the connectors allows for some play in the lateral direction to aid in alignment. A light force is applied to the seat component along the direction of engagement and as the interlocking members of the connectors become more forcibly engaged, the fit becomes tighter and the separate components are forced into precise alignment by the interlocking members of the connectors. When the first side of the seat is securely engaged, the first interlocking members of the connectors on the opposite side of the seat are visually aligned with second interlocking members of the connectors on the corresponding side of the second support component and a light force is applied to securely engage the interlocking members of the connectors. At this point the assembly is self supporting and can be oriented upright on the floor with the seat component in its final orientation. Additional forces can be applied to the top of the seat component so that all of the interlocking members of the connectors that are attached to the seat are rigidly engaged and the second interlocking members of the connectors on each of the two side support panels that support the back panel are now in their proper locations. The back panel is lifted into place so that the first interlocking members of the connectors on both sides of the back panel are visually aligned with the second interlocking members of the connectors on the corresponding surfaces of both side support frames to begin engagement. A light downward force is applied to the top of the back component and as the interlocking members of the connectors on both sides of the back become engaged the back is pulled into precise alignment. The back is slid downward with enough force to fully engage the snap locking features on the interlocking members of the connectors and the assembly process is complete.

Persons versed in the art of the invention could envision a number of different applications where a hidden or low profile connection between two frame components or panels is desired. In one embodiment of the invention the side support panels can come up to form the arms of a chair above the surface of the seat. In another embodiment the side support panels can be left open in this area to provide an armless version of a chair. The seat and back components can be extended to provide additional width between the arms to construct loveseats and sofas and the back can be eliminated completely to construct an upholstered bench or ottoman. In another embodiment of the invention, certain styles of upholstery may require that the seat component be permanently attached to the side members and only the back component is shipped unassembled and then assembled in the field using the interlocking members of the connectors of the present invention.

Furniture pieces not using upholstery like tables, desks and cabinets could also be constructed using the interlocking members of the connectors as described. Non-furniture pieces like upholstered panels for recreational vehicles and other interior spaces can be attached to walls or other surfaces using the interlocking members of the connectors as well.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A connector, the connector comprising:
a first interlocking member, the first interlocking member comprising a first base member having first and second sides, a first raised portion, and a first support member extending between the first side of the first base member and the first raised portion, the first support member comprises an edge, wherein at least a portion of the first raised portion overhangs the edge of the first support member such that the at least a portion of the first raised portion that overhangs the edge of the first support member, the first support member adjacent thereto and the first base member opposite thereof define an elongate first aperture, and wherein the first raised portion and first support member define first and second ends and wherein the width of at least one of the first raised portion and first support member increases from the first end to the second end;
a second interlocking member, the second interlocking member comprising a second base member having first and second sides, a second raised portion, and a second support member extending between the first side of the second base member and the second raised portion, the second support member comprises an edge, wherein at least a portion of the second raised portion overhangs the edge of the second support member such that the at least a portion of the second raised portion that overhangs the edge of the second support member, the second support member adjacent thereto and the second base member opposite thereof define an elongate second aperture, and wherein the second raised portion and second base member define a groove having first and second ends, and wherein the width of the groove increases from the first end to the second end to correspond to the configuration of the width of the at least one of the first raised portion and first support member; and
wherein the second interlocking member is structured to matingly engage the first interlocking member in a female/male connection wherein the at least a portion of the first raised portion that overhangs the edge of the first support member is slidably received in the elongate second aperture and the at least a portion of the second raised portion that overhangs the edge of the second support member is slidably received in the elongate first aperture.

2. A connector as recited in claim 1, wherein at least one corner of at least one of the first base member and the second base member is rounded.

3. A connector as recited in claim 1, wherein at least one corner of at least one of the first raised portion and the second raised portion is rounded.

4. A connector as recited in claim 1, wherein at least one of the first raised portion and the second raised portion is rounded.

5. A connector as recited in claim 1, wherein at least one of the first raised portion and the second raised portion is at least partially hollow.

6. A connector as recited in claim 5, wherein the at least one of the first raised portion and the second raised portion that is at least partially hollow comprises at least one structural rib.

7. A connector as recited in claim 1, wherein the first raised portion defines first and second ends and further comprises an elongate groove along the center axis of the first raised portion extending from the first end to the second end, wherein the second base member comprises a U-shaped grove defining a flexible locking member, and wherein the second end comprises a cross rib that defines a snap lock attachment configured to receive the flexible locking member when the first and second interlocking members are mated together.

8. A connector as recited in claim 7, wherein the cross rib defines an inclined surface configured to guide the flexible locking member over the cross rib.

9. A connector as recited in claim 1, wherein at least one of the first and second base members defines at least one aperture therethrough.

10. A connector as recited in claim 1, wherein at least one of the first base member and second base member comprises a support member extension extending from the second side thereof.

11. A method of manufacturing furniture, comprising:
providing a first frame component;
providing a second frame component;
mounting a first interlocking member in the first frame component, wherein the first interlocking member comprises a first base member having first and second sides, a first raised portion, and a first support member extending between the first side of the first base member and the first raised portion, the first support member comprises an edge, wherein at least a portion of the first raised portion overhangs the edge of the first support member such that the at least a portion of the first raised portion that overhangs the edge of the first support member, the first support member adjacent thereto and the first base member opposite thereof define an elongate first aperture, and wherein the first raised portion and first support member define first and second ends and wherein the width of at least one of the first raised portion and first support member increases from the first end to the second end; and
mounting a second interlocking member in the second frame component, wherein the second interlocking member comprises a second base member having first and second sides, a second raised portion, and a second support member extending between the first side of the second base member and the second raised portion, the second support member comprises an edge, wherein at least a portion of the second raised portion overhangs the edge of the second support member such that the at least a portion of the second raised portion that overhangs the edge of the second support member, the second support member adjacent thereto and the second base member opposite thereof define an elongate second aperture, and wherein the second raised portion and second base member define a groove having first and second ends, and wherein the width of the groove increases from the first end to the second end to correspond to the configuration of the width of the at least one of the first raised portion and first support member; and
matingly engaging the second interlocking member with the first interlocking member in a female/male connection wherein the at least a portion of the first raised portion that overhangs the edge of the first support member is slidably received in the elongate second aperture and the at least a portion of the second raised portion that overhangs the edge of the second support member is slidably received in the elongate first aperture.

12. The method as recited in claim 11 further comprising:
forming an aperture in at least one of the first frame member and second frame member;
wherein at least one of the first and second base members, respectively, comprises a support member extension extending from the second side thereof; and
inserting the support member extension in the aperture.

13. A connector, the connector comprising:
a first interlocking member, the first interlocking member comprising a first base member having first and second sides, a first raised portion, and a first support member extending between the first side of the first base member and the first raised portion, wherein at least a portion of the first raised portion overhangs the edge of the first support member such that the at least a portion of the first raised portion that overhangs the edge of the first support member, the first support member adjacent thereto and the first base member opposite thereof define an elongate first aperture;
a second interlocking member, the second interlocking member comprising a second base member having first and second sides, a second raised portion, and a second support member extending between the first side of the second base member and the second raised portion, wherein at least a portion of the second raised portion overhangs the edge of the second support member such that the at least a portion of the second raised portion that overhangs the edge of the second support member, the second support member adjacent thereto and the second base member opposite thereof define an elongate second aperture;
wherein the second interlocking member is structured to matingly engage the first interlocking member in a female/male connection wherein the at least a portion of the first raised portion that overhangs the edge of the first support member is slidably received in the elongate second aperture and the at least a portion of the second raised portion that overhangs the edge of the second support member is slidably received in the elongate first aperture; and
wherein the first raised portion defines first and second ends and further comprises an elongate groove along the center axis of the first raised portion extending from the first end to the second end, wherein the second base member comprises a U-shaped grove defining a flexible locking member, and wherein the second end comprises a cross rib that defines a snap lock attachment configured to receive the flexible locking member when the first and second interlocking members are mated together.

14. A connector as recited in claim 13, wherein the first raised portion and first support member define first and second ends and wherein the width of at least one of the first raised portion and first support member increases from the first end to the second end.

15. A connector as recited in claim 14, wherein the second raised portion and second base member define a groove having first and second ends, and wherein the width of the groove increases from the first end to the second end to correspond to the configuration of the width of the at least one of the first raised portion and first support member.

16. A connector as recited in claim 13, wherein at least one of the first base member and second base member comprises a support member extension extending from the second side thereof, wherein the support member extension defines a plurality of supports.

17. A connector, the connector comprising:
a first interlocking member, the first interlocking member comprising a first base member having first and second sides, a first raised portion, and a first support member extending between the first side of the first base member and the first raised portion, wherein at least a portion of the first raised portion overhangs the edge of the first support member such that the at least a portion of the first raised portion that overhangs the edge of the first support member, the first support member adjacent thereto and the first base member opposite thereof define an elongate first aperture;
a second interlocking member, the second interlocking member comprising a second base member having first and second sides, a second raised portion, and a second support member extending between the first side of the second base member and the second raised portion, wherein at least a portion of the second raised portion overhangs the edge of the second support member such that the at least a portion of the second raised portion that overhangs the edge of the second support member, the second support member adjacent thereto and the second base member opposite thereof define an elongate second aperture;
wherein the second interlocking member is structured to matingly engage the first interlocking member in a female/male connection wherein the at least a portion of the first raised portion that overhangs the edge of the first support member is slidably received in the elongate second aperture and the at least a portion of the second raised portion that overhangs the edge of the second support member is slidably received in the elongate first aperture; and
wherein at least one of the first base member and second base member comprises an elongate support member extension extending from the second side thereof, wherein the elongate support member extension defines a perimeter and a plurality of supports supporting the perimeter.

18. A connector as recited in claim 17, wherein the first raised portion and first support member define first and second ends and wherein the width of at least one of the first raised portion and first support member increases from the first end to the second end.

19. A connector as recited in claim 18, wherein the second raised portion and second base member define a groove having first and second ends, and wherein the width of the groove increases from the first end to the second end to correspond to the configuration of the width of the at least one of the first raised portion and first support member.

20. A connector as recited in claim 17, wherein the first raised portion defines first and second ends and further comprises an elongate groove along the center axis of the first raised portion extending from the first end to the second end, wherein the second base member comprises a U-shaped grove defining a flexible locking member, and wherein the second end comprises a cross rib that defines a snap lock attachment configured to receive the flexible locking member when the first and second interlocking members are mated together.

* * * * *